United States Patent
Fu et al.

(10) Patent No.: US 6,724,532 B1
(45) Date of Patent: Apr. 20, 2004

(54) DUAL-LENS HYBRID DIFFRACTIVE/REFRACTIVE IMAGING SYSTEM

(75) Inventors: Chiun-Lern Fu, Hsinchu (TW); Tsung-Hsin Lin, Hsinchu (TW); Hsin-Yih Lin, Hsinchu (TW); Mao-Hong Lu, Taipei (TW); Deh-Ming Shyu, MiaoLi (TW)

(73) Assignee: Industrial Technologies Research Institute, Hsinchu (TW)

( * ) Notice: Subject to any disclaimer, the term of this patent is extended or adjusted under 35 U.S.C. 154(b) by 0 days.

(21) Appl. No.: 10/339,335

(22) Filed: Jan. 10, 2003

(51) Int. Cl.[7] .............................. G02B 27/44; G02B 5/18
(52) U.S. Cl. .................. 359/566; 359/794; 359/793; 359/717; 359/646; 359/661; 359/748
(58) Field of Search ................................ 359/793, 794, 359/709, 717, 646, 651, 566, 661, 748, 796, 753, 691, 692

(56) References Cited

U.S. PATENT DOCUMENTS 5,917,661 A * 6/1999 Tochigi et al. ............... 359/717
6,097,551 A * 8/2000 Kreitzer ....................... 359/793

* cited by examiner

Primary Examiner—Drew Dunn
Assistant Examiner—Leo Boutsikaris
(74) Attorney, Agent, or Firm—Troxell Law Office PLLC

(57) ABSTRACT

The present invention discloses a dual-lens hybrid diffractive/refractive imaging system comprising: a first lens including a concave surface and a convex surface; and the second lens including a convex surface and a concave surface. The concave surface of the first lens is an objective surface facing the object. The convex surface faces the convex surface of the second lens, while the concave surface of the second lens faces the charge-coupled device (CCD) through a filter. Any surface of the first lens and the second lens is spheric or aspheric. Moreover, the imaging system comprises at least one diffractive surface, referred to as a hybrid diffractive/refractive surface, formed on any surface of the two lenses. Therefore, aberration is eliminated and image quality is improved without increasing the number of lenses.

5 Claims, 5 Drawing Sheets

| Surface | Radius | Thickness | Material | Diameter | K Value | A4 | A6 | A8 | A10 |
|---|---|---|---|---|---|---|---|---|---|
| aspheric surface 31 | -3.968498 | 3.6 | PMMA | 7.022144 | -0.7047051 | -0.00067542389 | 0.00038661469 | -1.6006482e-5 | 1.6182975e-7 |
| aspheric surface 32 | -2.723581 | 1.8 | | 6.438811 | -2.899337 | -0.00086211709 | 0.00011032003 | 8.7757254e-6 | -6.926809505e-7 |
| diffractive surface 41_1 | 5.813768 | 0.0 | DOE | 3.230996 | -5.477093 | 0.024087507 | 0.0018579344 | -0.00075885851 | 7.9493545e-5 |
| aspheric surface 41_2 | 5.814499 | 2.4 | PMMA | 3.231021 | 0.04770508 | 0.020571411 | 0.0020375517 | -0.00077401231 | 8.0308801e-5 |
| aspheric surface 42 | 10.28495 | 1.0 | | 2.447512 | 49.59974 | 0.017912059 | 0.00038906644 | 0.0011196024 | -0.0011960709 |

DUAL-LENS HYBRID DIFFRACTIVE/REFRACTIVE IMAGING SYSTEM

BACKGROUND OF THE INVENTION

1. Field of the Invention

The present invention generally relates to a dual-lens hybrid diffractive/refractive imaging system and, more particularly, to an imaging system composed of a first lens and a second lens, in which an objective surface of the first lens is concave and any surface of the first lens and the second lens is spheric or aspheric. Moreover, the imaging system comprises at least one diffractive surface, referred to as a hybrid diffractive/refractive surface, formed on any surface of the two lenses. Therefore, aberration is eliminated and image quality is improved without increasing the number of lenses.

2. Description of the Prior Art

A conventional imaging system generally includes a plurality of refractive elements so as to achieve better image quality. For example, Taiwan Patent Publication No. 442685 entitled "Imaging lens system" discloses a imaging system comprising five lens elements, and Taiwan Patent Publication No. 432241 entitled "Hybrid lens system" discloses a imaging system comprising three lens elements. As a result, both the volume and the weight increase, which goes against the tendency towards size minimization of any consumer electronic product. However, with the rapid development in optics, there have been provided various diffractive elements, whereby multi-focusing, ring-shaped focusing and wavelength dividing can be achieved. Thus, by combining a diffractive element and a refractive element, better image quality is obtained without increasing the number of lenses.

Please refer to FIG. 1, which is a schematic diagram showing a prior art "LENSES FOR ELECTRONIC IMAGING SYSTEMS" disclosed in U.S. Pat. No. 6,097,551. The imaging system comprises a first lens 1 including a convex surface 11 and a concave surface 12, and a second lens 2 including a convex surface 21 and a concave surface 22. The convex surface 11 is an objective surface. The convex surface 21 facing the first lens 1 is a hybrid diffractive/refractive surface, while the concave surface 22 faces a charge-coupled device (CCD) 6. Even though better image quality can be obtained by using the convex surface 21 without increasing the number of lenses, the curvature of the first lens is large enough to make fabrication difficult. In addition, the convex surface 11 is an objective surface such that the field of view is limited, resulting in large size, large thickness, heavy weight and high cost of the first lens 1.

SUMMARY OF THE INVENTION

In view of the aforementioned issue, it is the primary object of the present invention to provide a dual-lens hybrid diffractive/refractive imaging system, characterized in that a diffractive element is profiled on a surface of a refractive lens such that aberration is eliminated and image quality is improved without increasing the number of lenses.

It is another object of the present invention to provide a dual-lens hybrid diffractive/refractive imaging system, in which a first lens has a small curvature that makes fabrication simple.

It is still another object of the present invention to provide a dual-lens hybrid diffractive/refractive imaging system, in which an objective surface of the imaging system is concave, resulting in a large field of view.

It is yet another object of the present invention to provide a dual-lens hybrid diffractive/refractive imaging system, in which the parameters used in the imaging system are easily obtained according to practical cases.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing a dual-lens hybrid diffractive/refractive imaging system can be exemplified but not limited by the preferred embodiment as described hereinafter.

Figure 1:
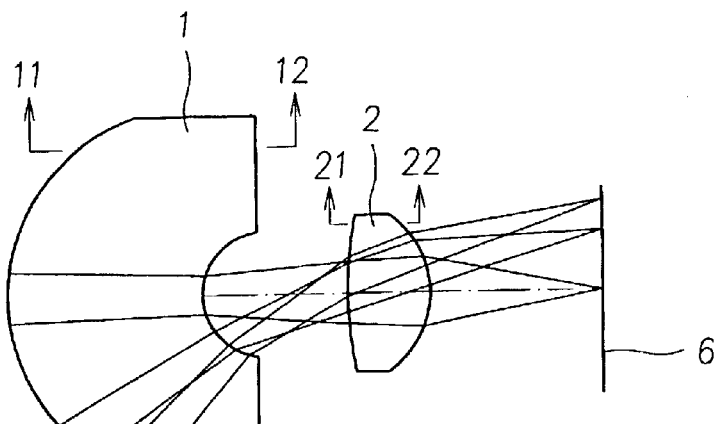
FIG. 1 is a schematic diagram showing an imaging system according to the prior art.
Figure 2:
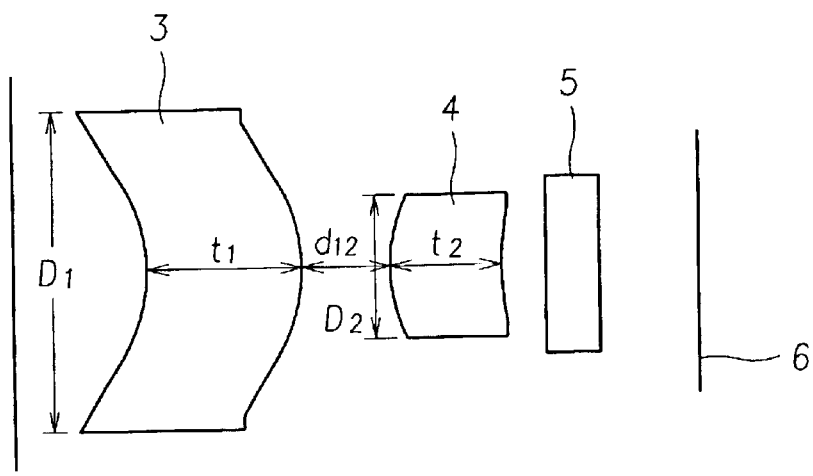
FIG. 2 is a schematic diagram showing an imaging system according to a preferred embodiment of the present invention.
Figure 3:
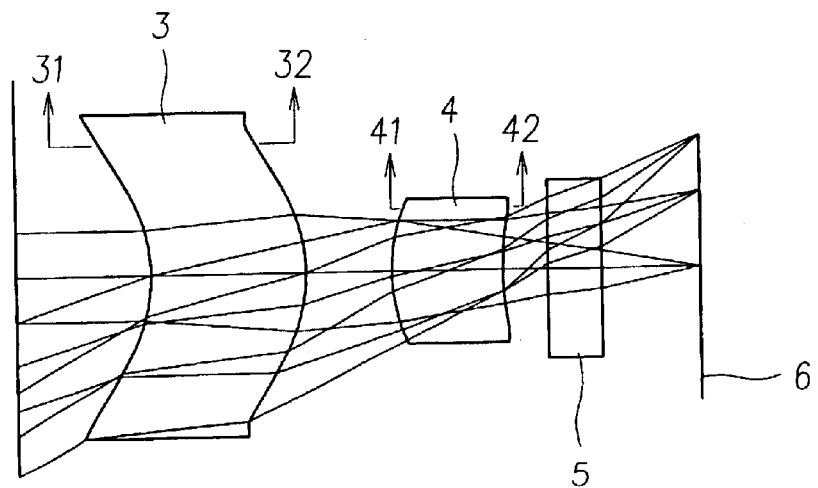
FIG. 3 is a schematic diagram showing the optical path in the imaging system of FIG. 2.

Please refer to FIG. 2 and FIG. 3, in which the dual-lens hybrid diffractive/refractive imaging system with a focus length $f_0$ comprises: a first lens 3 having a focus length $f_1$ and a thickness $t_1$, wherein an objective surface is concave and $f_1>0$; and a second lens 4 having a focus length $f_2$ and a thickness $t_2$, wherein $f_2>0$ and the distance between the first lens 3 and the second lens 4 is $d_{12}$, which is larger than one fourth of the focus length $f_0$, where:

$f_1>0$ $f_1/f_0>1.5$ $t_1/f_0>0.5$ $f_2>0$ $d_{12}/f_0>0.3$ $t_2/f_0>0.3$ $D_1/D_{EP}>3$ $D_2/D_{EP}>1.4$ where $D_{EP}$ is the diameter of an entrance pupil, $D_1$ is the diameter of the first lens and $D_2$ is the diameter of the second lens.

Accordingly, the aforementioned boundary conditions are considered to optimize the solution of the dual-lens hybrid diffractive/refractive imaging system.

Figures 3A, 4:
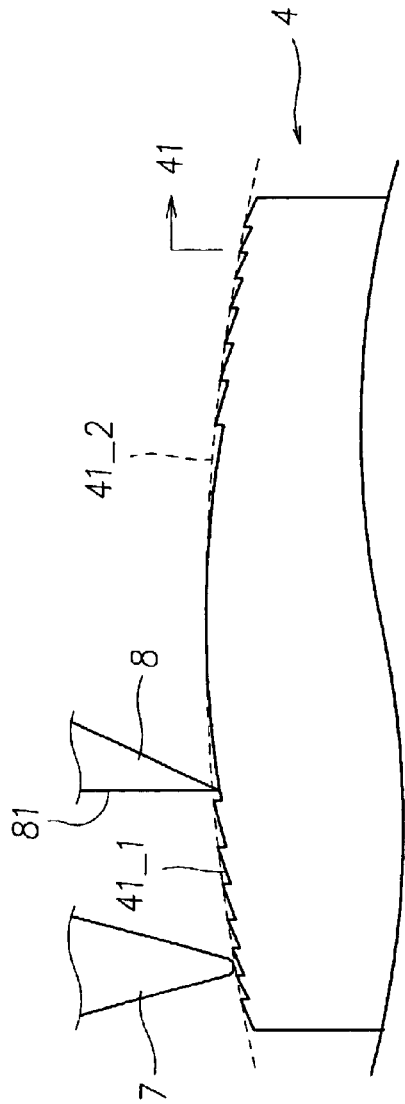
FIG. 3A is a schematic diagram showing the formation of the objective lens in the imaging system of FIG. 2.
FIG. 4 is a table showing the parameters used in the preferred embodiment of the present invention.
Figure 5:
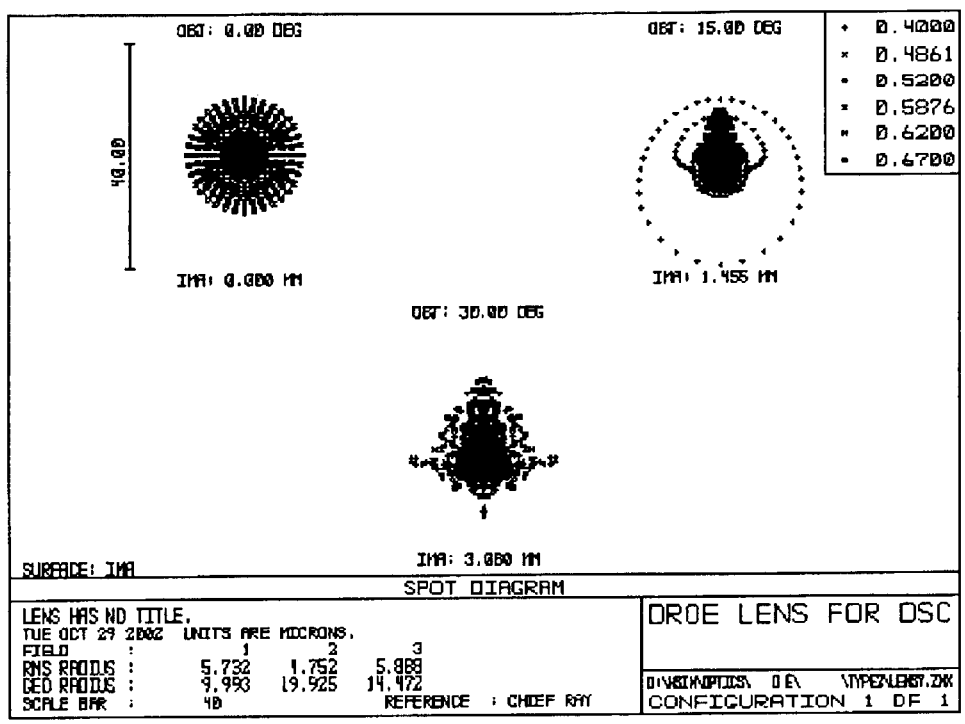
FIG. 5 is a spot diagram of the preferred embodiment of the present invention.
Figure 6:
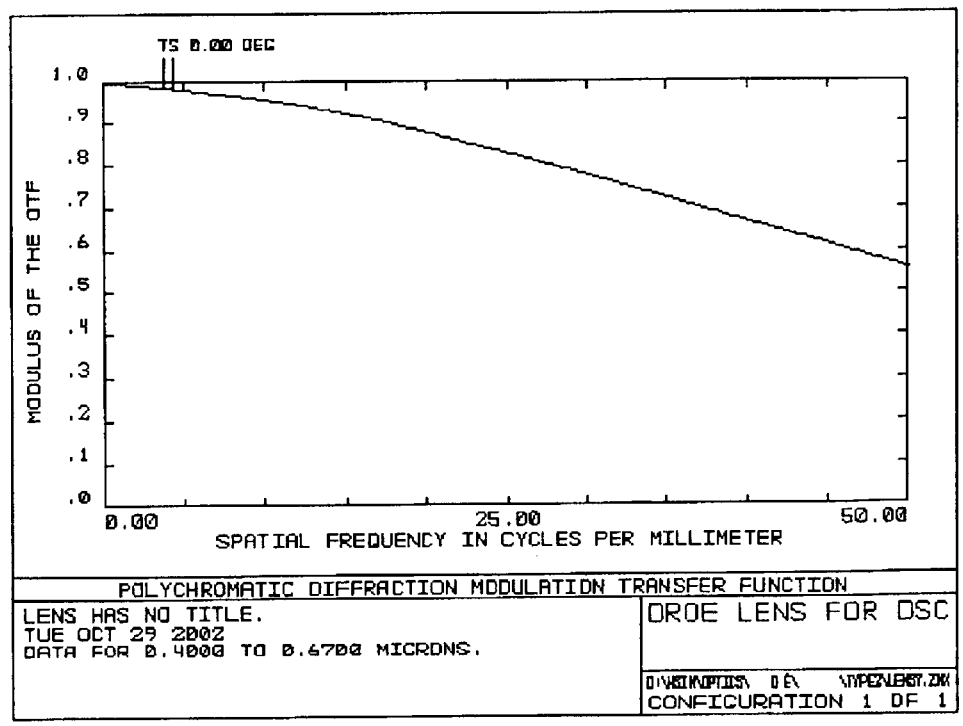
FIG. 6 is a graph showing the modulation transfer function at TS=0° of the preferred embodiment of the present invention.
Figure 7:
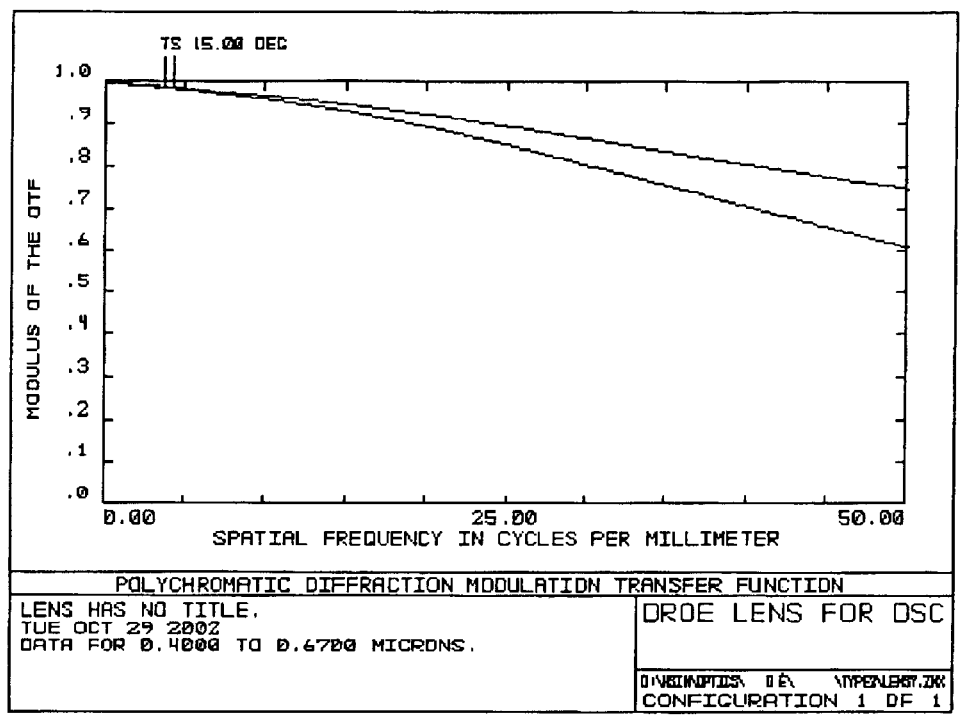
FIG. 7 is a graph showing the modulation transfer function at TS=15° of the preferred embodiment of the present invention.
Figure 8:
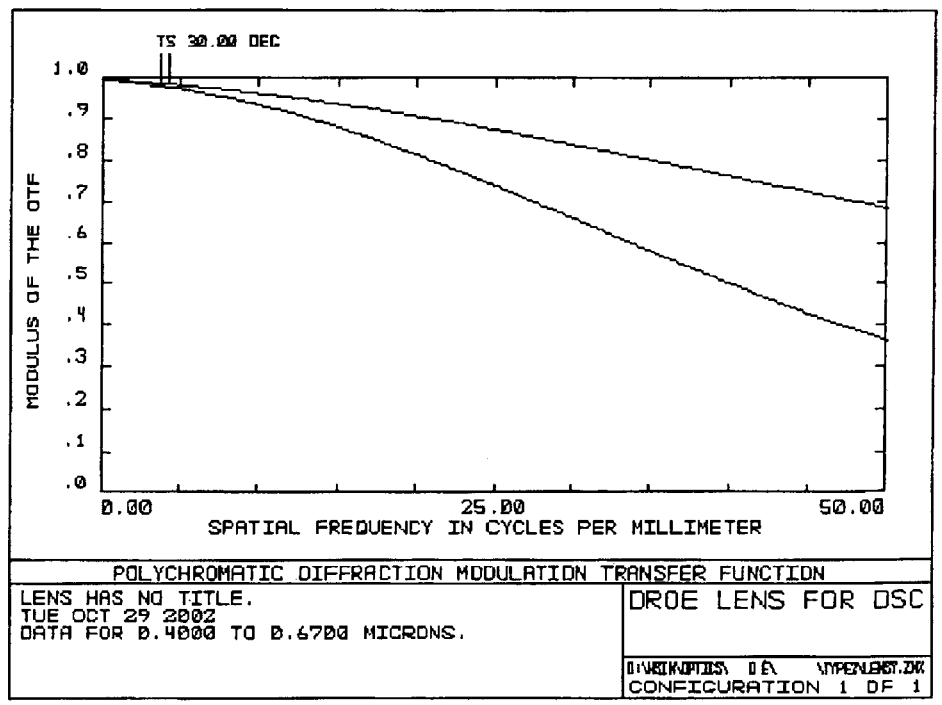
FIG. 8 is a graph showing the modulation transfer function at TS=30° of the preferred embodiment of the present invention.
Figure 9:
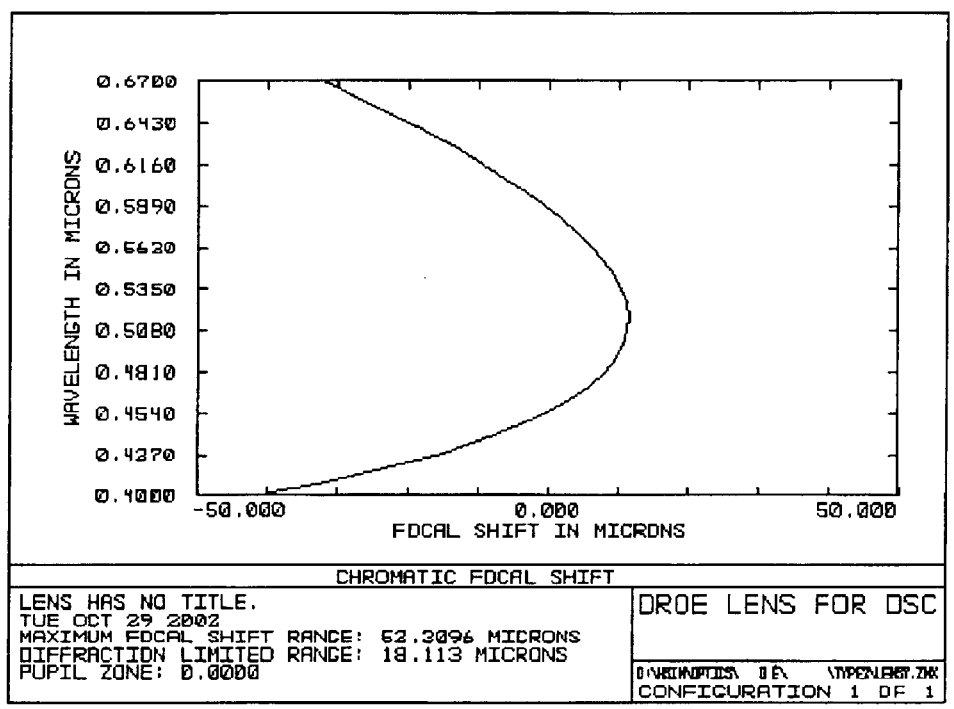
FIG. 9 is a graph showing the chromatic focal shift of the preferred embodiment of the present invention.
Figure 10:
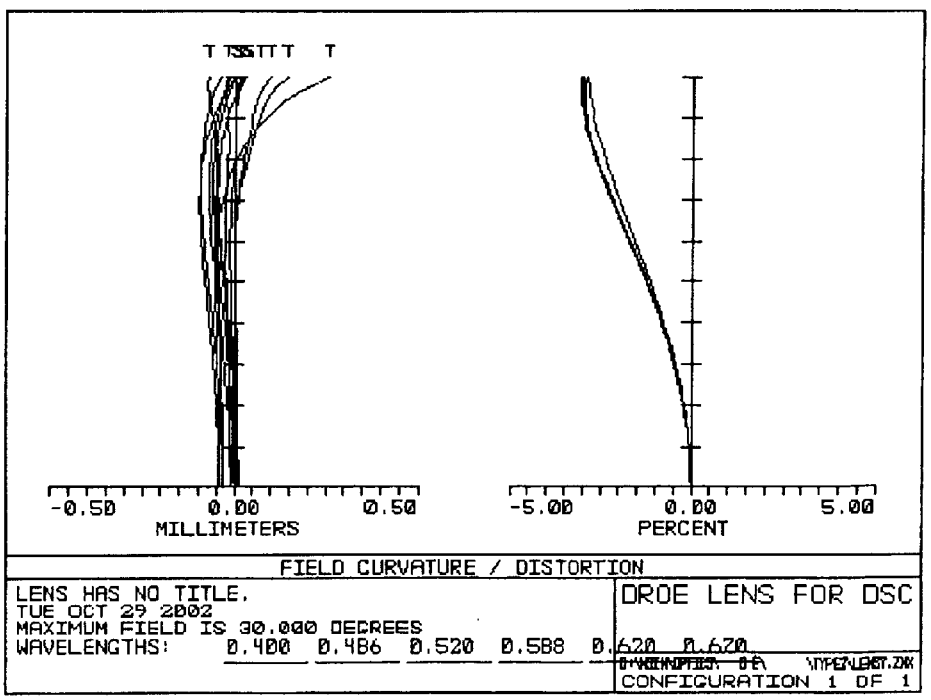
FIG. 10 is a graph showing the field curvature and distortion of the preferred embodiment of the present invention.

In FIG. 2 and FIG. 3, a filter 5 and a charge-coupled device (CCD) 6 are used with the first lens 3 and the second lens 4. The field of view and the focus length $f_0$ are 60° and 5.5 mm, respectively. FIG. 4 is a table showing the parameters used in the preferred embodiment. The first lens 3 including a concave surface 31 and a convex surface 32 and the second lens 4 including a convex surface 41 and a concave surface 42 are aspheric and formed of one of acrylic, glass and other optic materials. The concave surface 31 of the first lens 3 is an objective surface facing the object. The convex surface 32 faces the convex surface 41 of the second lens 4, while the concave surface 42 of the second lens 4 faces the charge-coupled device (CCD) 6. The filter 5 is interposed between the concave surface 42 of the second lens 4 and the CCD 6. Moreover, the imaging system comprises at least one hybrid diffractive/refractive surface formed on any surface of the two lenses. In the present embodiment, the hybrid diffractive/refractive surface is formed on the convex surface 41 of the second lens 4.

Please further refer to FIG. 3A, which is a schematic diagram showing the formation of the objective lens in the imaging system of FIG. 2. An arc-shaped cutting tool 7 with a tip diameter of 0.2 mm is used to make the convex surface 41 of the second lens 4 an aspheric surface 41_2. Though the aspheric surface 41_2 is a temporary surface, it is necessary to limit the profile error of the aspheric surface 41_2 within 1 μm. Then a triangular cutting tool 8 with a tip diameter smaller than 0.3 μm is used to form a diffractive surface 41_1. The triangular cutting tool 8 has a vertical edge 81 such that the diffractive surface 41_1 and the aspheric surface 41_2 can be formed precisely on the convex surface 41. The diffractive surface 41_1 and the aspheric surface 41_2 are formed according to Sweater Model, which derives the following parameters,

| | |
|---|---|
| $f_1$ = 9.04 mm | $f_2$ = 17.56 mm |
| $t_1$ = 3.6 mm | $t_2$ = 2.4 mm |
| $D_1$ = 7.02 mm | $D_2$ = 3.23 mm |
| Power1 = 0.1106 | Power2 = 0.05695 |
| $D_{EP}$ = 2.0 mm | |
| $d_{12}$ = 1.8 mm | |

FIG. 5 to FIG. 10 show some other optic characteristics. As shown in these drawings, the present embodiment exhibits excellent modulation transfer function (MTF), small field curvature and little distortion, leading to elimination of aberration. Please note that the present invention provides better image quality without increasing the number of lenses and is suitable for use in consumer electronic products such as DVD players and digital cameras with smaller size, lighter weight and lower cost.

According to the above discussion, the present invention discloses a dual-lens hybrid diffractive/refractive imaging system such that aberration is eliminated and image quality is improved without increasing the number of lenses. Therefore, the present invention has been examined to be novel, unobvious and useful.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A dual-lens hybrid diffractive/refractive imaging system with a focus length $f_0$, comprises:

a first lens having a focus length $f_1$ and a thickness $t_1$, wherein an objective surface of said first lens is concave; and a second lens having a focus length $f_2$ and a thickness $t_2$, wherein a distance between said first lens and said second lens is $d_{12}$, where, $f_1 > 0$ $f_1/f_0 > 1.5$ $t_1/f_0 > 0.5$ $f_2 > 0$ $d_{12}/f_0 > 0.3$ $t_2/f_0 > 0.3$.

2. The dual-lens hybrid diffractive/refractive imaging system as recited in claim 1, wherein said imaging system have a diameter of an entrance pupil $D_{EP}$, said first lens has a diameter $D_1$ and said second lens has a diameter $D_2$, where, $D_1/D_{EP} > 3$.

$D_2/D_{EP} > 1.4$.

3. The dual-lens hybrid diffractive/refractive imaging system as recited in claim 1, wherein said imaging system comprises at least one diffractive surface, and any surface of said first lens and said second lens is one of a spheric surface and an aspheric surface.

4. The dual-lens hybrid diffractive/refractive imaging system as recited in claim 3, wherein on said any surface of said first lens and said second lens is formed said hybrid diffractive surface, referred to as a hybrid diffractive/refractive surface.

5. The dual-lens hybrid diffractive/refractive imaging system as recited in claim 1, wherein said first lens and said second lens are formed of one of acrylic, glass and other optic materials.

* * * * *